United States Patent
Ichikawa et al.

(10) Patent No.: US 6,681,233 B1
(45) Date of Patent: Jan. 20, 2004

(54) DATA CIRCULATION BETWEEN SERVERS AND CLIENTS

(75) Inventors: Hiroshi Ichikawa, Kawasaki (JP); Kiyoshi Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/337,060

(22) Filed: Jun. 21, 1999

(30) Foreign Application Priority Data

Sep. 29, 1998 (JP) .......................................... 10-274486

(51) Int. Cl.[7] .............................................. G06F 17/30
(52) U.S. Cl. ...................... 707/203; 707/511; 709/232; 713/171
(58) Field of Search ................................ 707/203, 511; 709/232; 713/171

(56) References Cited

U.S. PATENT DOCUMENTS 5,940,829 A * 8/1999 Tsuiki et al. .................. 707/10
6,067,551 A * 5/2000 Brown et al. ............... 707/203

FOREIGN PATENT DOCUMENTS

| JP | 9-91402 | 4/1997 |
| JP | 9-138824 | 5/1997 |
| JP | 9-198326 | 7/1997 |

* cited by examiner

Primary Examiner—Emanuel Todd Voeltz
(74) Attorney, Agent, or Firm—Katten Muchin Zavis Rosenman

(57) ABSTRACT

A method of circulating data between servers while updating the data between the servers includes the steps of downloading registered data having a first access key attached thereto from a source server to a client, the first access key including a server identifier of the source server and a first user identifier of a user who registered the registered data, uploading a file from the client to a destination server, the file including updating data and the registered data having the first access key attached thereto, comparing, in the destination server, the registered data and the first access key uploaded from the client with the registered data and the first access key that are obtained from the source server in response to a request sent from the destination server to the source server, and registering the file in the destination server if the comparison gives a match.

19 Claims, 10 Drawing Sheets

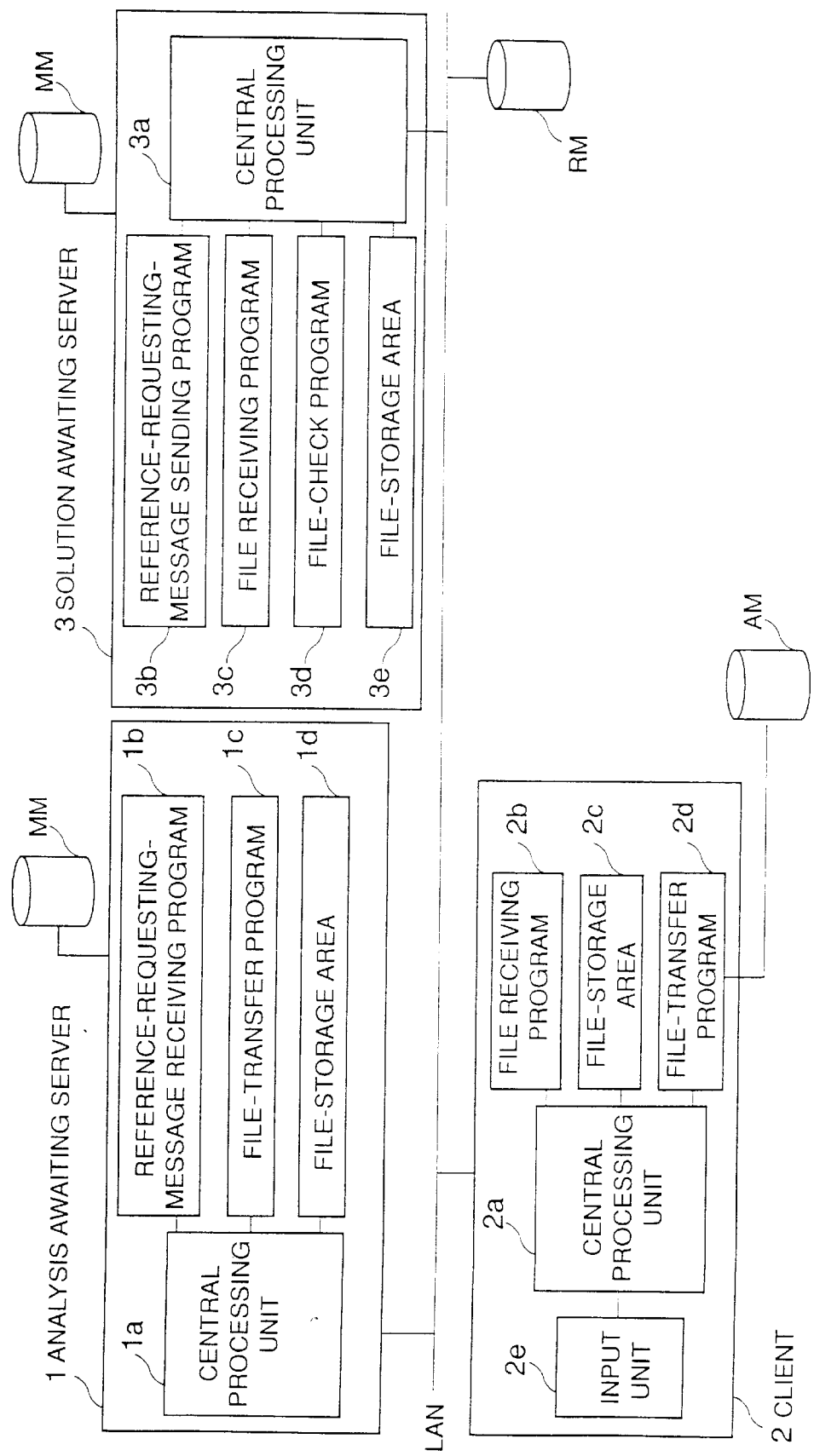

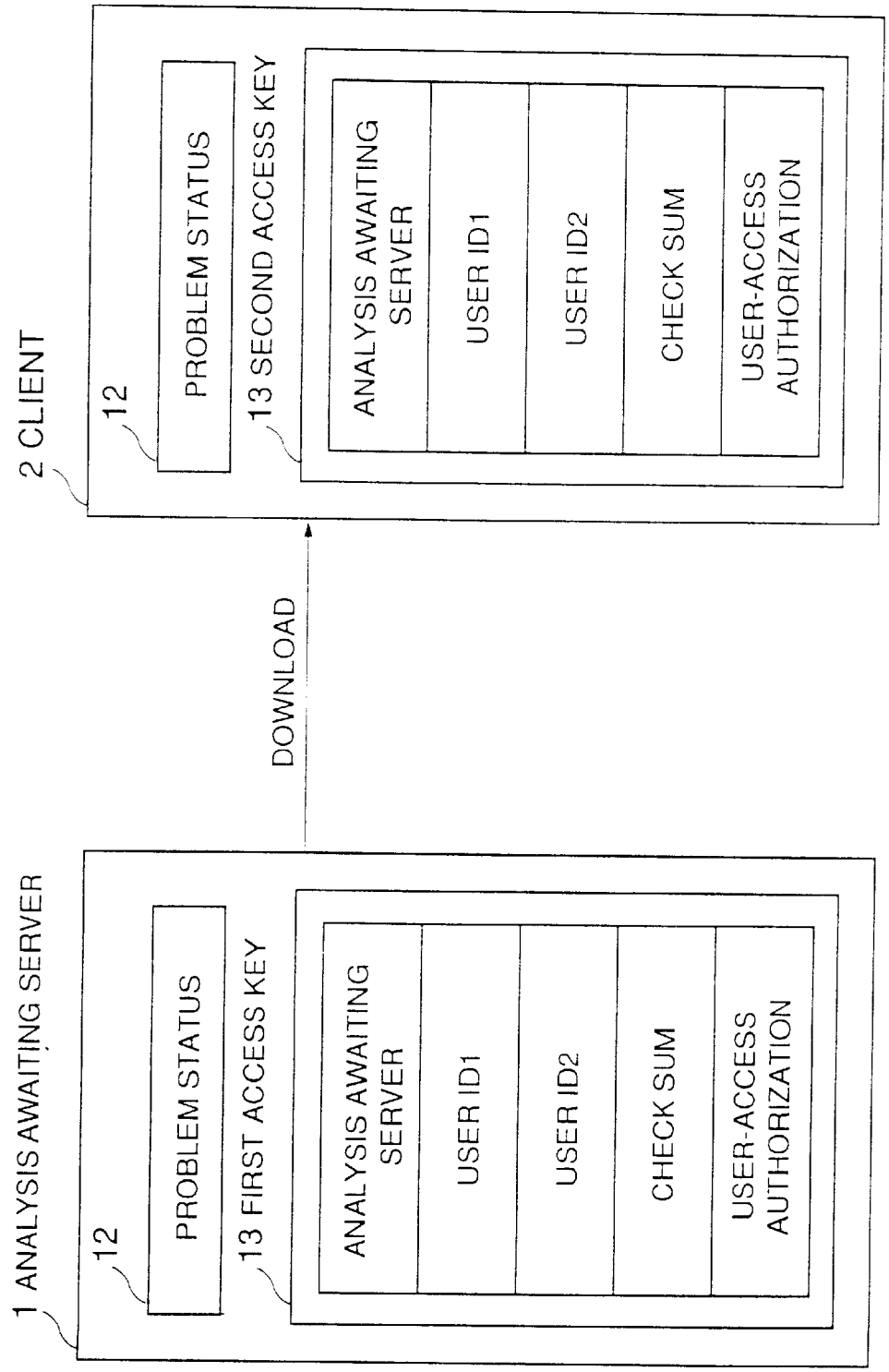

FIG.5

| ACCESS KEY | CONTENTS |
|---|---|
| FIRST ACCESS KEY | ① ANALYSIS AWAITING SERVER (SERVER 1)<br>② USER ID1 (USER WHO REGISTERED PROBLEM STATUS IN ANALYSIS AWAITING SERVER)<br>③ USER ID2 (USER WHO IS ENTITLED TO DOWNLOAD FILE FROM ANALYSIS AWAITING SERVER)<br>④ CHECK SUM<br>⑤ USER-ACCESS AUTHORIZATION (PERMITTED SCOPE OF MODIFICATION) |
| SECOND ACCESS KEY | ① SOLUTION AWAITING SERVER (SERVER 2)<br>② USER ID1 (USER WHO UPLOADED FILE TO SOLUTION AWAITING SERVER)<br>③ USER ID2 (USER WHO IS ENTITLED TO DOWNLOAD FILE FROM SOLUTION AWAITING SERVER)<br>④ CHECK SUM<br>⑤ USER-ACCESS AUTHORIZATION (PERMITTED SCOPE OF MODIFICATION) |

DATA CIRCULATION BETWEEN SERVERS AND CLIENTS

BACKGROUND OF THE INVENTION

1. Field of the Invention

The present invention generally relates to systems for performing routine business operations, and particularly relates to a method of controlling data circulation between servers and clients in a system equipped with a data storage function, a data circulation function, and a security management function for achieving computerized work flow.

2. Description of the Related Art

A work-flow system defines a flow of business operations so that the business operations involving a number of people are carried out according to the defined flow. In a system for circulating electronic documents in a network, for example, an order of circulation is registered in a work-flow server in advance, and the documents are circulated or processed in the defined order. In such a system, it is necessary to control data storage, data circulation, and data security.

In a work-flow system, data is stored in a registration-source server, and a client accesses the registration-source server to download necessary data. The client may modify the data, and uploads the data to a circulation-destination server (which may or may not be different from the registration-source server). This is the way business operations are typically performed in a work-flow system.

FIGS. 9A through 9C are illustrative drawings for explaining a related-art work-flow system.

In FIGS. 9A through 9C, a registration-source server 80 stores registered files. The registered files include issues that need to be solved, and are registered by other clients. A user uses a client 81 to download a file from the registration-source server 80, and modifies the downloaded file. A circulation-destination server 82 receives a file uploaded from the client 81 after the file is modified in the client 81. The modified file may include answers to the issues to be solved.

In the following, a description will be given with regard to a related-art method of controlling data circulation between servers and clients in a work-flow system.

In FIG. 9A, a user download a file from the registration-source server 80 to the client 81. After modifying the file in the client 81, the user uploads the file to the circulation-destination server 82. At the time of uploading, no check is made as to whether the file is modified according to a correct procedure by a legitimate user.

In the system of FIG. 9A, the client 81 can illegally download a file from a server different from the registration-source server 80. In such a case, the circulation-destination server 82 simply accepts the file when the file after modification is submitted from the client 81.

In FIG. 9B, the client 81 downloads a file from the registration-source server 80. If the registration-source server 80 does not retain the downloaded file, and if the client 81 loses data of the file, the data cannot be recovered.

If the registration-source server 80 retains the file without deleting it, there will be no opportune occasion on which the circulated data is removed.

In FIG. 9C, a server/client system based on a centralized server is structured by combining the registration-source server and the circulation-destination server. In this configuration, the load on the server is undesirably heavy.

Further, a chance of losing data is high when the server suffers malfunction to stop providing services.

A technology relating to a work-flow data management, by which programs and files are downloaded from a server to a client and are returned to a server after modification thereof, is disclosed in Japanese Patent Laid-open Applications No. 9-91402, No. 9-138824, and No. 9-198326. No. 9-91402 teaches retaining data when a system malfunction or a system down occurs. No. 9-138824 teaches checking and correcting circulated documents in a work-flow system, and discloses controlling date-and-time indications of circulars. No. 9-198326 teaches identifying a user who has handled a document upon finding of a problem in the document in response to a user request.

The method of controlling data circulation between servers and clients in the related-art work-flow system as described above has the following problems.

There is no check function to check the contents of a file when the file is downloaded from a server to a client and is uploaded to a circulation-destination server after modification of the file. Because of lack of such a check function, an illegal file can be uploaded to the circulation-destination server. Also, there is no way of detecting a tampering when a user or an administrator tampers with registered data stored in the registration-source server.

Further, there is no check function to verify legality of a user and a file between the registration-source server and the circulation-destination server. For example, any user can upload a file to the circulation-destination server without properly downloading the file from the registration-source server. This poses a security problem.

Moreover, when a file is downloaded from a registration-source server to a client, loss of data of the file on the client side results in no possibility of recovering data since the server does not retain the downloaded data. As previously mentioned, if the server retains the data, there will be no seasonal timing to delete the data after the circulation thereof.

In a system in which a single server functions as the registration-source server and the circulation-destination server, the load on the server is excessively heavy. Also, there is a risk of mistakenly rewriting data of the registration-source server.

Accordingly, there is a need for such a method of controlling data circulation between servers and clients in a work-flow system that an illegal user is prevented from downloading or uploading a file from or to a server.

There is another need for such a method of controlling data circulation between servers and clients in a work-flow system that a check can be made as to illegality of files between servers.

There is still another need for such a method of controlling data circulation between servers and clients in a work-flow system that a file can be recovered when a user mistakenly deletes the file.

There is yet another need for such a method of controlling data circulation between servers and clients in a work-flow system that erroneous erasure of files is prevented in the registration-source server.

SUMMARY OF THE INVENTION

Accordingly, it is a general object of the present invention to provide a method of controlling data circulation between servers and clients in a work-flow system such that the method can satisfy the needs described above.

It is another and more specific object of the present invention to provide such a method of controlling data circulation between servers and clients in a work-flow system that an illegal user is prevented from downloading or uploading a file from or to a server.

It is another object of the present invention to provide such a method of controlling data circulation between servers and clients in a work-flow system that a check can be made as to illegality of files between servers.

It is still another object of the present invention to provide such a method of controlling data circulation between servers and clients in a work-flow system that a file can be recovered when a user mistakenly deletes the file.

It is still another object of the present invention to provide such a method of controlling data circulation between servers and clients in a work-flow system that erroneous erasure of files is prevented in the registration-source server.

In order to achieve the above objects according to the present invention, a method of circulating data between servers while updating the data between the servers includes the steps of downloading registered data having a first access key attached thereto from a source server to a client, the first access key including a server identifier of the source server and a first user identifier of a user who registered the registered data, uploading a file from the client to a destination server, the file including updating data and the registered data having the first access key attached thereto, comparing, in the destination server, the registered data and the first access key uploaded from the client with the registered data and the first access key that are obtained from the source server in response to a request sent from the destination server to the source server, and registering the file in the destination server if the comparison gives a match.

The method described above insures that a check can be made as to illegality of files between the servers.

According to one aspect of the present invention, the method as described above further includes the steps of including in the first access key a second user identifier of a user who is entitled to download the registered data, comparing, in the source server, the second user identifier with a user identifier of a user who attempts to download the registered data when the clients attempts to download the registered data, and allowing the client to download the registered data if the comparison of the user identifiers gives a match.

The method described above insures that an illegal user is prevented from downloading a file from the source server.

According to another aspect of the present invention, the method as described above is such that the step of uploading a file includes uploading, as part of the file, a second access key that includes a server identifier of the destination server and a second user identifier of a user who generated the updating data, the method further comprising a step of checking, in the destination server, whether the second user identifier included in the uploaded second access key matches a user identifier of a user who uploaded the file.

The method described above insures that an illegal user is prevented from uploading a file to the destination server.

According to another aspect of the present invention, the method as described above further includes the steps of sending from the destination server to the source server a message indicative of registration of the file when the file is registered in the destination server, and deleting the registered data and the first access key in the source server when the source server receives the message.

The method described above insures that a file can be recovered when a user mistakenly deletes the file, and that erroneous erasure of files is prevented in the source server.

Other objects and further features of the present invention will be apparent from the following detailed description when read in conjunction with the accompanying drawings.

BRIEF DESCRIPTION OF THE DRAWINGS

FIG. 2 is a block diagram of a work-flow system according to an embodiment of the present invention;

FIG. 4 is an illustrative drawing for explaining a data structure of a downloaded file;

FIG. 5 is an illustrative drawing showing details of first and second access keys;

DESCRIPTION OF THE PREFERRED EMBODIMENTS

In the following, a principle and embodiments of the present invention will be described with reference to the accompanying drawings.

Figure 1:
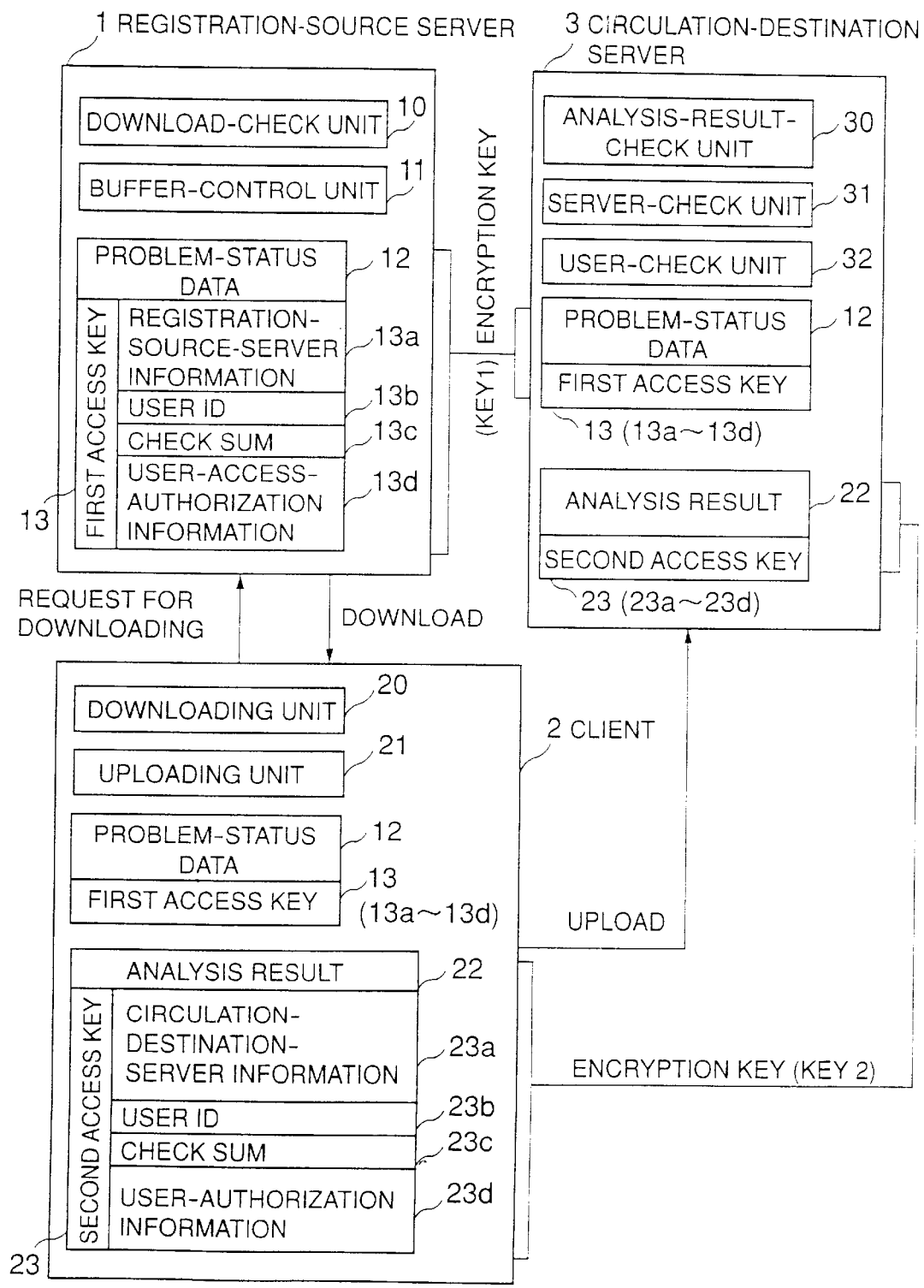
FIG. 1 is an illustrative drawing showing a configuration of a work-flow system according to a principle of the present invention.

FIG. 1 is an illustrative drawing showing a configuration of a work-flow system according to a principle of the present invention.

The system of FIG. 1 includes a registration-source server 1, a client 2, and a circulation-destination server 3.

The registration-source server 1 includes a download-check unit 10, a buffer-control unit 11, and a memory which stores problem-status data 12 and a first access key 13. The client 2 includes a downloading unit 20, an uploading unit 21, and a memory which stores the problem-status data 12 and the first access key 13 as well as an analysis result 22 and a second access key 23. The circulation-destination server 3 includes an analysis-result-check unit 30, a server-check unit 31, a user-check unit 32, and a memory which stores the problem-status data 12 and the first access key 13 as well as the analysis result 22 and the second access key 23. The analysis-result-check unit 30 checks whether a file uploaded as a result of analysis (modification) originates from the registration-source server. The server-check unit 31 checks a registration-source server included in an uploaded file so as to decide whether the registration-source server is a legal registration server. The user-check unit 32 checks whether a user ID (or password) included in an uploaded file is a legitimate user ID.

The first access key 13 stored in the registration-source server 1 is used for checking whether the problem-status data 12 is legitimate and for checking whether access to the problem-status data 12 is made by a legitimate user. The first access key 13 includes a registration-source-server information 13a, a user ID 13b, a check sum 13c, and a user-accessauthorization information 13d. The user ID 13b includes an ID of a user who is entitled to download a file from the registration-source server 1 and an ID of a user who registered the problem-status data in the registration-source server 1. The check sum 13c is used for checking whether the data is correct the user-access-authorization information 13d concerns an access authorization given to a user. The access authorization defines files to which modification can be made. The second access key 23 includes a circulation-destination server information 23a, a user ID 23b, a check sum 23c, and a user-authorization information 23d. The user ID 23b includes an ID of a user who uploaded a file to the circulation-destination server 3 and an ID of a user who is entitled to download a file from the circulation-destination server 3. The check sum 23c is used for checking correctness of data.

The problem-status data 12 and the first access key 13 stored in the registration-source server 1 may be encrypted so as to prevent tampering subsequent to registration thereof. When a user enters a request along with a user ID in the client 2 to request downloading of a file from the registration-source server 1, the downloading unit 20 of the client 2 is activated. In response, the download-check unit 10 of the registration-source server 1 uses the first access key 13 to check legitimacy of the user ID sent from the client 2. If the user ID is legitimate, the downloading request is accepted, and the problem-status data 12 and the first access key 13 are downloaded from the registration-source server 1 to the client 2. The user modifies the problem-status data 12, and the modified data is stored as the analysis result 22. The second access key 23 used for the uploading purpose is also stored along with the analysis result 22. The uploading unit 21 uploads the analysis result 22 and the second access key 23 along with the problem-status data 12 and the first access key 13 to the circulation-destination server 3. In order to prevent later tampering of the analysis result 22 and the second access key 23, the analysis result 22 and the second access key 23 may be encrypted.

In the circulation-destination server 3, the analysis-result-check unit 30 uses the second access key 23 attached to the analysis result 22 to check the file of the analysis result 22. The purpose is to check whether the file is a legitimate file modified in the client 2. Further, the server-check unit 31 obtains a server name included in the first access key 13, and requests the registration-source server 1 to send the problem-status data 12 and the first access key 13. The problem-status data 12 and the first access key 13 sent from the registration-source server 1 are compared with the corresponding information uploaded from the client 2 in order to check whether the file was originally downloaded from the legitimate registration-source server 1.

Further, the user-check unit 32 uses the user ID of the second access key 23 to check whether the user ID (or password) of the uploaded file is an ID of a valid user. These check operations insure that the uploaded file has not been tampered with, and that the file was originally downloaded from the legitimate registration-source server 1, and is uploaded by a legitimate user. After the clearance, the uploaded file is officially registered in the circulation-destination server 3, which informs in turn the registration-source server 1 of the clearance of all the check points. In response, the registration-source server 1 has the buffer-control unit 11 delete the downloaded file from the buffer (memory). If all the check points are not cleared, on the other hand, the file is not deleted, and is returned to an initial status thereof. Because of this precaution, the file can be downloaded again if the user mistakenly erases the downloaded file during a process of modifying the file.

In the above description, a file is downloaded from the registration-source server 1 to the client 2, and is uploaded from the client 2 to the circulation-destination server 3. This procedure may be followed by a procedure in which the circulation-destination server 3 serves as a registration-source server to allow the client 2 to download a file therefrom, and the downloaded file is uploaded to another server.

In what follows, embodiments of the present invention will be described with reference to the accompanying drawings.

FIG. 2 is a block diagram of a work-flow system according to an embodiment of the present invention.

The system of FIG. 2 includes the analysis awaiting server 1 (equivalent to the registration-source server of FIG. 1), the client 2, and the solution awaiting server 3 (equivalent to the circulation-destination server 3 of FIG. 1), all of which are connected with each other via a LAN (local area network), for example.

The analysis awaiting server 1 includes a central processing unit 1a, a reference-requesting-message receiving program 1b, a file-transfer program 1c, and a file-storage area 1d. The client 2 includes a central processing unit 2a, a file receiving program 2b, a file-storage area 2c, a file-transfer program 2d, and an input unit 2e. The solution awaiting server 3 includes a central processing unit 3a, a reference-requesting-message sending program 3b, a file receiving program 3c, a file-check program 3d, and a file-storage area 3e. The input unit 2e is used for editing (modifying) a file.

The programs and the data necessary for operations of the analysis awaiting server 1 may be provided in a computer-readable medium MM such as a hard-drive disk, a floppy disk, a CD-ROM, or the like, or may be provided from a remote memory storage RM which is connected via a communication line such as the LAN. The same applies in the case of the programs and the data necessary for operations of the solution awaiting server 3 and the client 2.

Basic operations of the system of FIG. 2 will be described below.

1) When the client 2 requests the analysis awaiting server 1 to download a file, the file-transfer program 1c of the analysis awaiting server 1 sends the requested file to the client 2 from the file-storage area 1d.

2) The file receiving program 2b of the client 2 receives the file, and stores the file in the file-storage area 2c. A user edits the file by using the input unit 2e. After the editing of the file, the file-transfer program 2d sends the file to the solution awaiting server 3.

3) When the file receiving program 3c of the solution awaiting server 3 receives the file, the reference-requesting-message sending program 3b sends a reference requesting message to the analysis awaiting server 1.

4) The reference-requesting-message receiving program 1b of the analysis awaiting server 1 receives the reference requesting message, and, then, the file-transfer program 1c sends the file from the file-storage area 1d to the solution awaiting server 3.

5) When the file receiving program 3c of the solution awaiting server 3 receives the file, the file-check program 3d compares the file uploaded from the client 2 with the file received from the analysis awaiting server 1.

6) If the comparison indicates a satisfactory match, this fact is reported to the analysis awaiting server 1. In response, the analysis awaiting server 1 deletes the file in the file-storage area id.

In what follows, a description will be given with regard to a case in which a user downloads a file from the analysis awaiting server 1, and uploads an analysis result to the solution awaiting server 3. This is an example in which the present invention is applied to the management of a problem solving process.

Figure 3A:
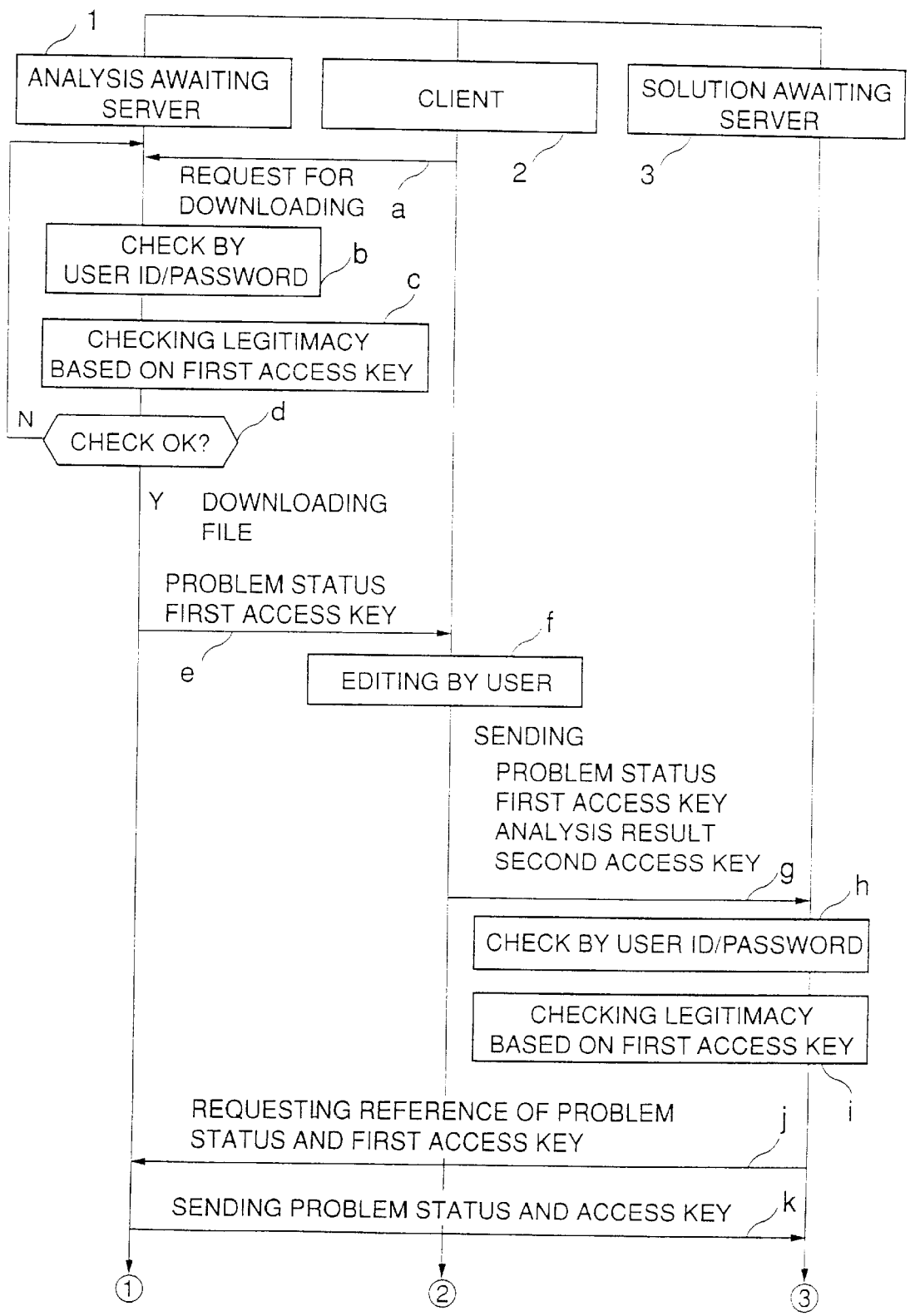
FIGS. 3A and 3B are sequence charts showing an operation sequence between servers and a client.
Figure 3B:
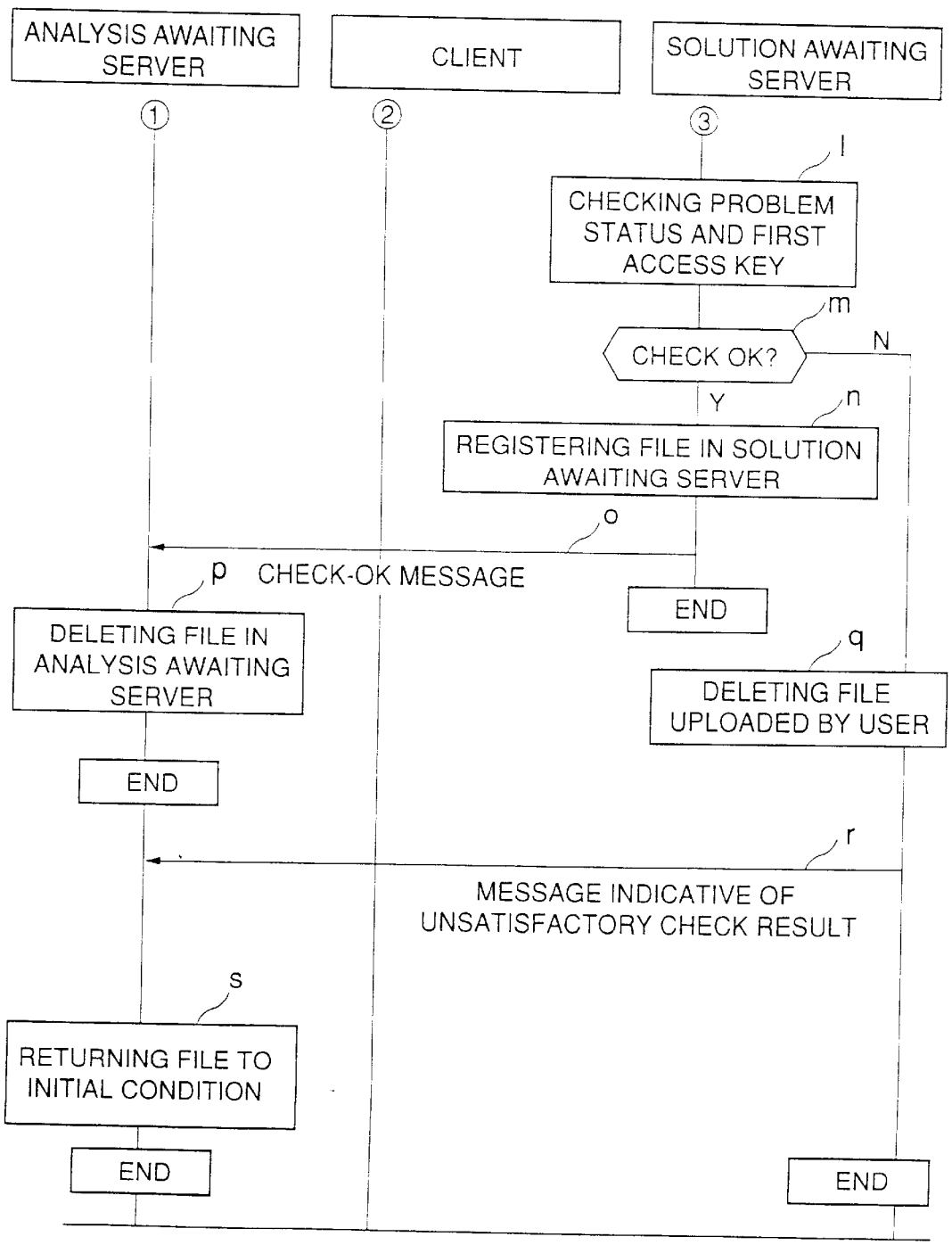
Figure 6:
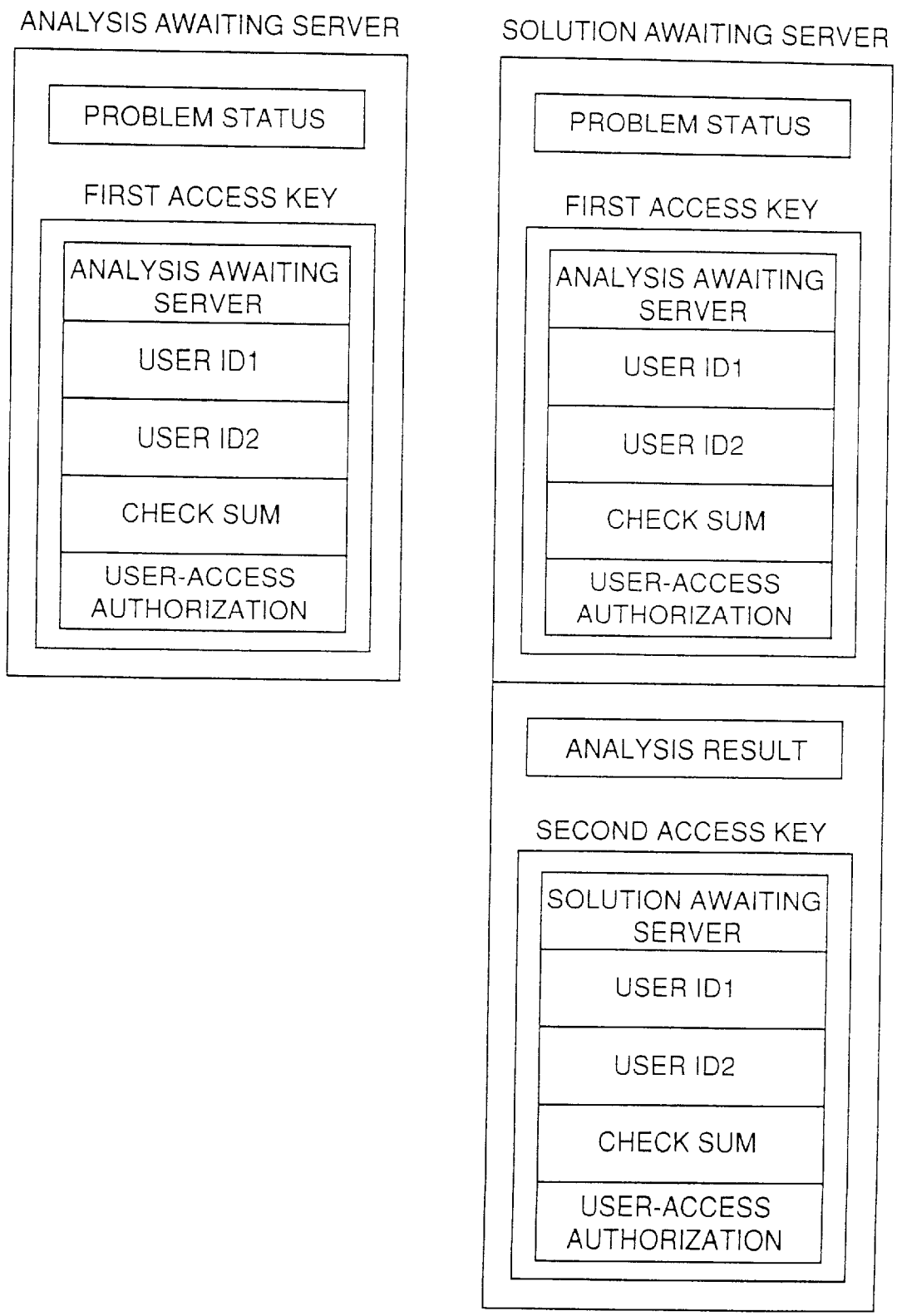
FIG. 6 is an illustrative drawing showing structures of data stored in the servers after uploading of the data.

FIGS. 3A and 3B are sequence charts showing an operation sequence between the servers and the client. FIG. 4 is an illustrative drawing for explaining a data structure of a downloaded file. FIG. 5 is an illustrative drawing showing details of the first and second access keys. FIG. 6 is an illustrative drawing showing structures of data stored in the servers after uploading of the data.

As shown in FIG. 4, the analysis awaiting server 1 stores the problem-status data 12 and the first access key 13. The problem-status data 12 and the first access key 13 may be encrypted based on a encryption key KEY1 (see FIG. 1). The encryption insures that a user conducting an analysis does not tamper with the problem-status data 12 and the first access key 13 after downloading the file from the analysis awaiting server 1. In this embodiment, the first access key includes the following information:

a) information about analysis awaiting server 1 that stores the problem-status data concerning problems to be solved;

b) a user ID1 of a user who uploaded the problem-status data to the analysis awaiting server 1;

c) a user ID2 of a user who is entitled to download a file from analysis awaiting server 1;

d) a check sum for checking an original document (problem-status data); and e) a user-access authorization which defines the scope of modification that the user can make.

The client 2 sends a download request along with a user ID (password) to the analysis awaiting server 1 (a of FIG. 3A) In response, the analysis awaiting server 1 checks the user ID to determine if the user is a legitimate user. Namely, the user ID sent from the user who requested downloading is compared with the user ID2 stored in the first access key that indicates the user who is entitled to download a file (b and c of FIG. 3A). A check is made whether the comparison indicates a match (d of FIG. 3A). If there is no match, the download request is denied. If there is a match, the download request is accepted, so that a file including the problem-status data 12 and the first access key 13 is downloaded (e of FIG. 3A). After the downloading, the client 2 has such data items as shown in FIG. 4.

In the client 2, a user in charge of problem analysis enters and edits an analysis result (22 of FIG. 1) responding to the problem-status data 12. When the analysis result is entered, the second access key (23 of FIG. 1) is created.

In this embodiment, the second access key includes information as shown in FIG. 5. A user ID1 of the second access key (i.e., an ID of a user who uploads a file to the solution awaiting server 3) is the same as the user ID2 of the first access key (i.e., the ID of the user who is entitled to download the file from the analysis awaiting server 1).

As shown in FIG. 5, the second access key includes:

a) information about the analysis awaiting server;

b) a user ID1 of a user who is in charge of problem analysis;

c) a user ID2 of a user who is in charge of problem solving;

d) a check sum for checking an original document (analysis result); and e) a user-access authorization which defines the scope of modification that the user can make.

After the editing operation, the client 2 sends to the solution awaiting server 3 the analysis result 22 and the second access key 23 along with the problem-status data 12 and the first access key 13 that are obtained from the analysis awaiting server 1 (g of FIG. 3A). The analysis result 22 and the second access key 23 may be encrypted by using an encryption key KEY2 (see FIG. 1). The purpose of the encryption is to prevent other users from tampering with the uploaded data.

After the uploading operation, the servers have data items stored therein as shown in FIG. 6.

Upon receiving the analysis result 22 and the second access key 23, the solution awaiting server 3 checks an ID of the second access key 23 to determine whether the uploading is performed by the user in charge of the problem analysis (h of FIG. 3A). If the check result is satisfactory, a legitimacy check is made based on the first access key 13 (i of FIG. 3A). To this end, a request for a reference of the problem-status data and the first access key is transmitted to the analysis awaiting server 1 (j of FIG. 3A). In response, the analysis awaiting server 1 sends the problem-status data and the first access key (k of FIG. 3A). Upon receiving the data and the key, the solution awaiting server 3 decrypts the data and the key if they are encrypted, and compares the problem-status data and the first access key with the corresponding information uploaded from the client 2 (l of FIG. 3B). Through this comparison, a check is made as to whether there is a sign of tampering and whether the file originates from a legitimate analysis awaiting server. Further, a check is made based on the user ID1 as to whether the file is uploaded by a legitimate user (m of FIG. 3B). If the comparison gives a match, the solution awaiting server 3 officially registers the uploaded file (n of FIG. 3B). Also, the solution awaiting server 3 notifies the analysis awaiting server 1 of clearance of all the check points (o of FIG. 3B).

Upon receiving the notification, the analysis awaiting server 1 deletes the file (i.e., the problem-status data and the first access key) (p of FIG. 3B). This deletion mechanism may be subject to an option setting, so that it may be turned off so as not to delete the file automatically.

If the comparison gives a mismatch, the solution awaiting server 3 deletes the uploaded file (i.e., the problem-status data and the first access key as well as the analysis result and the second access key) (q of FIG. 3B), and notifies the analysis awaiting server 1 of the mismatch (r of FIG. 3B). In response, the analysis awaiting server 1 returns the downloaded file to its original state.

In the following, an embodiment of a system comprised of a plurality of servers for controlling a problem solving process will be described with reference to an example showing a series of steps from detection of a problem to fixing of the problem in software development. When a problem occurs, this system undertakes the problem and analysis management, and assesses situations surrounding the problem. Then, the system issues a problem processing form to expedite a solution finding process, and circulates registered information to a person who is in charge of analysis and a person who is in charge of problem solving.

Figure 7:
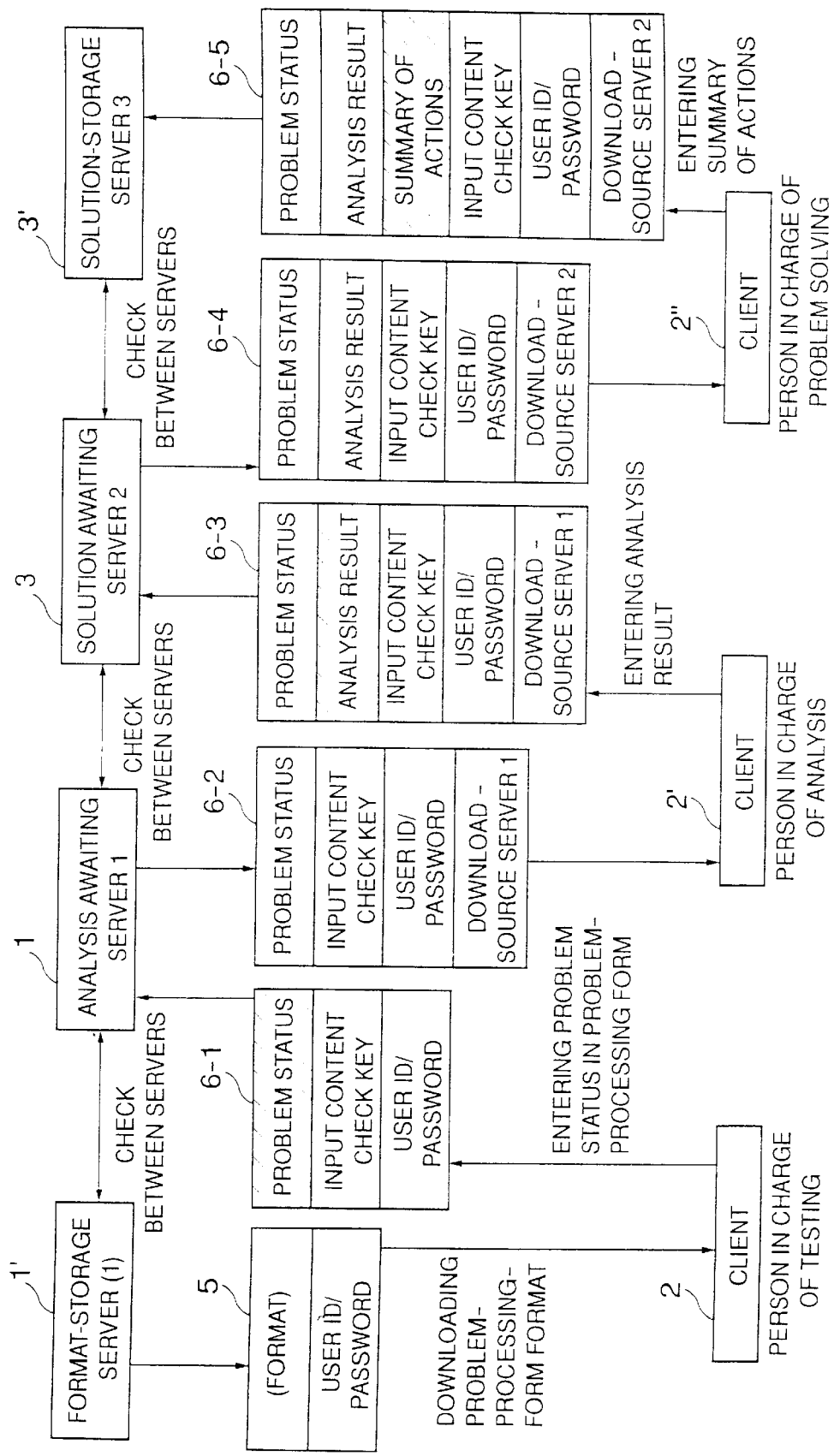
FIG. 7 is an illustrative drawing showing a flow of data circulation within the system from detection of a problem to fixing of the problem.
Figure 8:
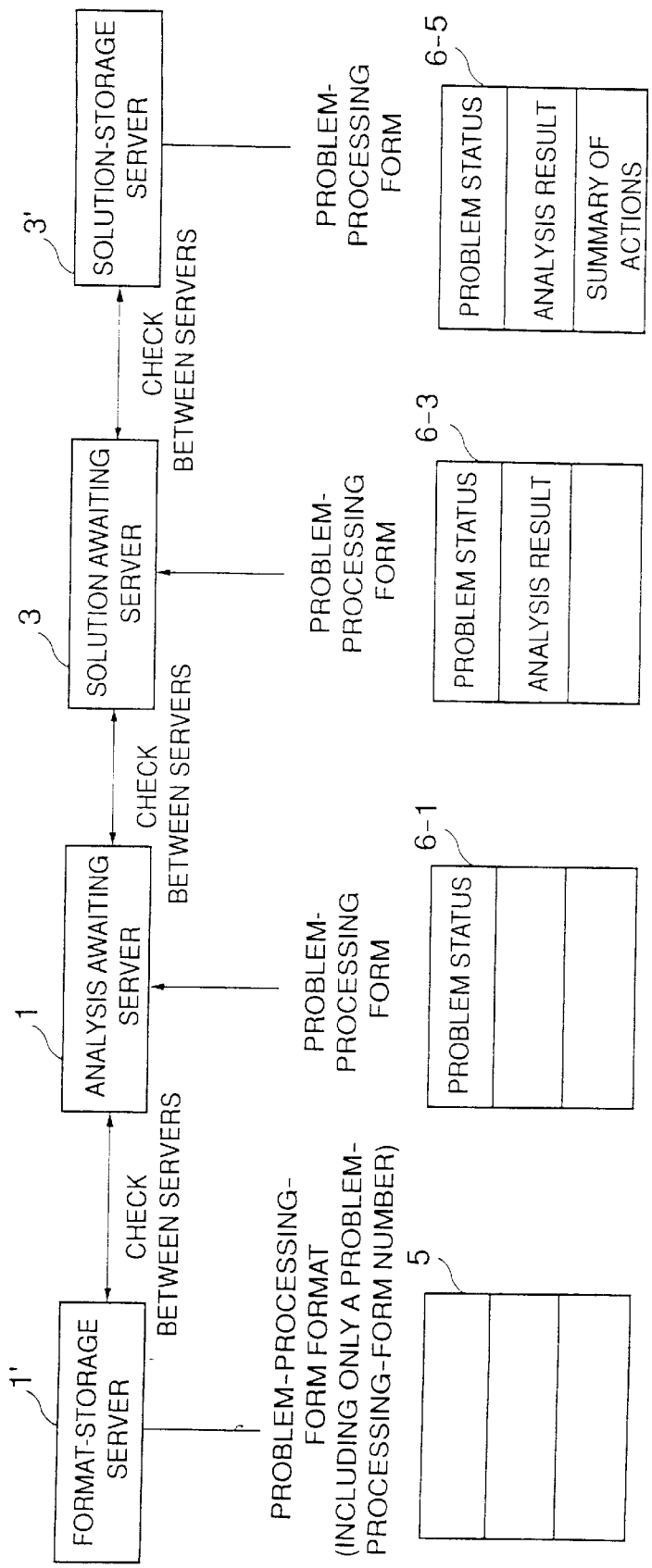
FIG. 8 is an illustrative drawing showing data items stored in each server.
Figure 9A:
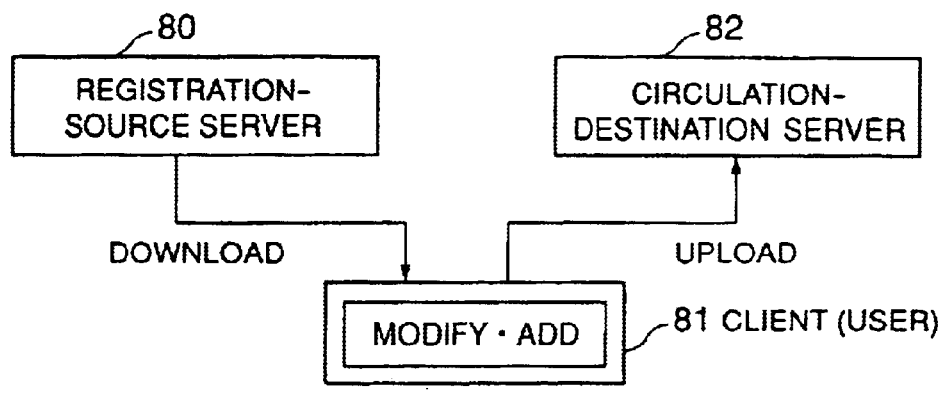
FIGS. 9A through 9C are illustrative drawings for explaining a related-art work-flow system.
Figure 9B:
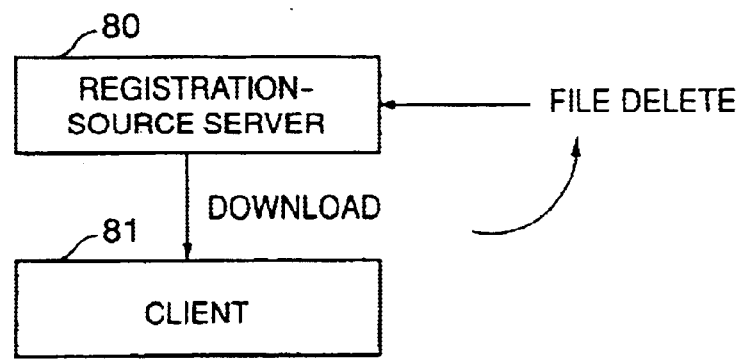
Figure 9C:
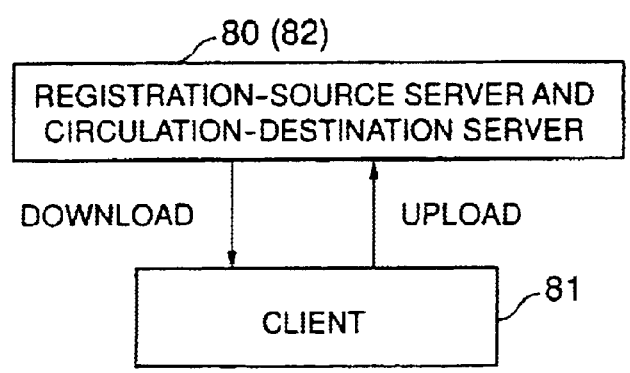

FIG. 7 is an illustrative drawing showing a flow of data circulation within the system from detection of a problem to fixing of the problem. FIG. 8 is an illustrative drawing showing data items stored in each server.

The system includes a format-storage server 1', the analysis awaiting server 1, the solution awaiting server 3, a solution-storage server 3', and the clients 2, 2' and 2". The format-storage server 1' stores a problem-processing-form format 5. A problem processing from is exchanged back and forth between the servers and clients, and is designated as 6-1 through 6-5, depending on the phase of the process through which the form is processed. The problem processing form 6-1 includes data created in the client 2 by a person in charge of testing. The problem processing form 6-2 is downloaded from the analysis awaiting server 1. The problem processing form 6-3 includes an analysis result in addition to the data of the problem processing form 6-2. The problem processing form 6-4 is downloaded from the solution awaiting server 3. The problem processing form 6-5 includes a status of fixed problem.

As shown in FIG. 8, the format-storage server 1' stores therein a problem-processing-form format. The analysis awaiting server 1 receives the uploaded problem processing form 6-1 with problem-status data included therein. The solution awaiting server 3 receives the problem processing form 6-3 uploaded thereto with an analysis result provided in response to the problem status. The solution-storage server 3' stores the problem processing form 6-5 including a status of the fixed problem that has been solved according to the analysis result.

In the following, a description will be given with regard to operations performed at the time of problem detection, analysis-result input, and problem-solution input.

1) Operation at Time of Problem Detection

When a person in charge of testing finds a problem, the client 2 downloads the problem-processing-form format 5 from the format-storage server 1'. The problem-processing-form format 5 includes an ID (password) of a user who downloaded the format.

The person in charge of testing registers a problem status in the downloaded problem-processing-form in the client 2, and sets the input-content check key (corresponding to a check sum of the first access key of FIG. 5) and a user ID (corresponding to the user ID2 of the first access key of FIG. 5) to generate the problem processing form 6-1. The problem processing form 6-1 is then uploaded to the analysis awaiting server 1.

The analysis awaiting server 1 checks the user ID1 of the file received from the client 2 by asking for a reference from the format-storage server 1' in order to determine if the user is a legitimate user. Further, the analysis awaiting server 1 checks the input-content check key to determine if the problem analysis is valid.

2) Operation at Time of Analysis-result Input

A person in charge of problem analysis downloads the problem processing form 6-2 to the client 2' from the analysis awaiting server 1. The problem processing form 6-2 includes identification of the server from which the file is downloaded. The analysis awaiting server 1 checks an user ID (password) of the person in charge of problem analysis in order to ascertain if the user is a legitimate user.

The person in charge of problem analysis registers an analysis result as a response to the problem status in the client 2', and generates the problem processing form 6-3 that includes the input-content check key, the user ID (password), and the download-source server name (analysis awaiting server 1). The problem processing form 6-3 is uploaded to the solution awaiting server 3.

The solution awaiting server 3 checks the input-content check key and the user ID received from the client 2' by obtaining a reference from the analysis awaiting server 1 to determine the legitimacy of the analysis result and the user's access authorization. Further, the solution awaiting server 3 checks the download-source server name to determine if the server from which the problem processing form 6-2 was downloaded is a legitimate server.

3) Operation at Time of Solution Input

A person in charge of problem solving downloads the problem processing form 6-4 from the solution awaiting server 3 to the client 2". The solution awaiting server 3 checks an user ID (password) of the person in charge of problem solving to ascertain the legitimacy of the user.

Using the client 2", the person in charge of problem solving enters a summary of actions that are taken in response to the analysis result, and generates the problem processing form 6-5 that includes the input-content check key, the user ID (password), the download-source server name. The problem processing form 6-5 is then uploaded to the solution-storage server 3'.

By obtaining a reference from the solution awaiting server 3, the solution-storage server 3' checks the input-content check key to determine if the contents of the summary of actions are legitimate, and checks the user ID (password) to ascertain if the user has a proper access authorization. Further, the solution-storage server 3' checks the download-source server name to check if the download-source server from which the problem processing form 6-4 was downloaded is a legitimate server.

The present invention as described above has the following advantages.

Use of the user ID makes it possible to prevent an illegitimate user from downloading a file form a server and uploading the file to a server. Further, use of the check sum insures that only correct data is accepted.

Communication between the servers based on predetermined protocols allows the circulation-destination server to check legitimacy of an uploaded file by checking with the registration-source server.

Even if the user deletes a file by mistake while editing the file, recovery of the file is guaranteed since the download-source server is still in possession of the downloaded file when the file is being edited.

The registered data is circulated between a plurality of servers and clients, so that the load on the servers and the clients is not as heavy as in a centralized configuration. Further, even if one server suffers malfunction, other servers sharing data with this server can assist recovery of the system.

Further, the present invention is not limited to these embodiments, but various variations and modifications may be made without departing from the scope of the present invention.

The present application is based on Japanese priority application no. 10-274486 filed on Sep. 29, 1998, with the Japanese patent office, the entire contents of which are hereby incorporated by reference.

What is claimed is:

1. A method of circulating data between servers while updating the data between the servers, comprising the steps of:

downloading registered data having a first access key attached thereto from a source server to a client, the first access key including a server identifier of the source server and a first user identifier of a user who registered the registered data;

uploading a file from the client to a destination server, the file including updating data and the registered data having the first access key attached thereto;

comparing, in the destination server, the registered data and the first access key uploaded from the client with the registered data and the first access key that are obtained from the source server in response to a request sent from the destination server to the source server; and registering the file in the destination server if the comparison gives a match.

2. The method as claimed in claim 1, further comprising the steps of:

including in the first access key a second user identifier of a user who is entitled to download the registered data;

comparing, in the source server, the second user identifier with a user identifier of a user who attempts to download the registered data when the client attempts to download the registered data; and allowing the client to download the registered data if the comparison of the user identifiers gives a match.

3. The method a claimed in claim 1, wherein the step of uploading a file includes uploading, as part of the file, a second access key that includes a server identifier of the destination server and a second user identifier of a user who generated the updating data, the method further comprising a step of checking, in the destination server, whether the second user identifier included in the uploaded second access key matches a user identifier of a user who uploaded the file.

4. The method as claimed in claim 1, further comprising the steps of:

sending from the destination server to the source server a message indicative of registration of the file when the file is registered in the destination server; and deleting the registered data and the first access key in the source server when the source server receives the message.

5. The method as claimed in claim 1, further comprising a step of deleting the file from the destination server if the file is not registered.

6. The method as claimed in claim 1, wherein the first access key further includes a check sum of the registered data.

7. The method as claimed in claim 3, wherein the second access key further includes a check sum of the updating data.

8. A system for circulating data while updating data, comprising:

a source server which stores registered data having a first access key attached thereto, and sends the registered data and the first access key in response to a request, the first access key including a server identifier of said source server and a first user identifier of a user who registered the registered data;

a destination server; and a client which downloads the registered data along with the first access key from said source server, and uploads a file to said destination server, the file including updating data and the registered data having the first access key attached thereto, wherein said destination server sends the request to said source server after receiving the file from said client so as to compare the registered data and the first access key uploaded from said client with the registered data ad the first access key sent from said source server, and registers the file in a file-storage area thereof if the comparison gives a match.

9. The system as claimed in claim 8, wherein the first access key includes a second user identifier of a user who is entitled to download the registered data, and wherein said source server compares the second user identifier with a user identifier of a user who attempts to download the registered data when said client attempts to download the registered data, and allows said client to download the registered data if the comparison of the user identifiers gives a match.

10. The system as claimed in claim 8, wherein said client uploads as part of the file a second access key that includes a server identifier of said destination server and a second user identifier of a user who generated the updating data, and said destination server checks whether the second user identifier included in the uploaded second access key matches a user identifier of a user who uploaded the file.

11. The system as claimed in claim 8, wherein said destination server sends to said source server a message indicative of registration of the file when the file is registered in said destination server, and said source server deletes the registered data and the first access key when said source server receives the message.

12. The source server of the system as claimed in claim 8.

13. The source server of the system as claimed in claim 11.

14. The client server of the system as claimed in claim 8.

15. The destination server of the system as claimed in claim 8.

16. A computer-readable medium having a program embodied therein for causing a computer to operate as a source server in a work-flow system, said program comprising:

a unit configured to allow a client to download an original file if a user of the client is entitled to download the original file, the original file including an identifier of the source server;

a unit configured to send the original file to another server in response to a request sent from said another server; and a unit configured to delete the original file in the source server in response to a message sent from said another server, the message indicating that said another server has registered in a data storage thereof an uploaded file originating from the original file and uploaded from the client after checking the uploaded file by using the original file that said another server obtained from the source server by issuing the request.

17. A computer-readable medium having a program embodied therein for causing a computer to operate as a destination server in a work-flow system, said program comprising:

a unit configured to receive an uploaded file uploaded from a client, the file including an identifier of a source server from which an original file of the uploaded file was downloaded;

a unit configured to send a request to the source server identified by the identifier in order to obtain the original file; and a unit configured to check whether the uploaded file is legitimate via comparison thereof with the original file obtained from the source server.

18. The computer-readable medium as claimed in claim 17, further comprising a unit configured to send a message to the source server when the check indicates legitimacy of the uploaded file, the message indicating the legitimacy of the uploaded file.

19. A method of circulating data between servers while updating the data between the servers, comprising the steps of:

receiving a request at a source server from a client for downloading registered data;

checking legitimacy of the request based on a first access key stored in the source server;

downloading the registered data with the first access key attached thereto from the source server to the client;

editing the registered data to create updating data in the client;

receiving a request at a destination server from the client for uploading updating data, the request including the updating data, the registered data and the first access key;

obtaining the registered data and the first access key by the destination server from the source server;

comparing, in the destination server, the registered data and the first access key received from the client with the registered data and the first access key that are obtained from the source server in response; and when comparison of the registered data and the first access key received from the client with the registered data and the first access key that are obtained from the source server gives a match, registering the updating data in the destination server and deleting the registered data in the source server.

* * * * *